United States Patent [19]

Verse et al.

[11] Patent Number: 4,880,077

[45] Date of Patent: Nov. 14, 1989

[54] BASE FOR A LOUDSPEAKER ENCLOSURE

[76] Inventors: Gisbert Verse; Michael Schröder, both of Gelsenkirchen, Fed. Rep. of Germany

[21] Appl. No.: 264,457

[22] Filed: Oct. 31, 1988

[30] Foreign Application Priority Data

| Mar. 8, 1988 [DE] | Fed. Rep. of Germany ... 8803128[U] |
| Apr. 12, 1988 [DE] | Fed. Rep. of Germany ... 8804767[U] |
| May 17, 1988 [DE] | Fed. Rep. of Germany ... 8806446[U] |

[51] Int. Cl.$^4$ .............................................. F16F 15/00
[52] U.S. Cl. .................................... 181/207; 181/148; 381/205; 248/665; 248/636; 248/638; 248/677
[58] Field of Search .................. 181/148, 207, 208; 381/205; 248/615, 632, 634, 636, 638, 677

[56] References Cited

U.S. PATENT DOCUMENTS

| 2,893,665 | 7/1959 | Paulser | 248/615 |
| 3,419,240 | 12/1968 | Santic | 248/615 X |
| 3,747,880 | 7/1973 | Bock | 181/148 X |
| 4,219,099 | 8/1980 | Sacks | 181/153 |
| 4,251,045 | 2/1981 | Meyerle | 181/148 X |
| 4,575,034 | 3/1986 | Tobey | 248/615 X |
| 4,633,973 | 1/1987 | Kitano | 181/207 |

Primary Examiner—B. R. Fuller
Attorney, Agent, or Firm—Sixbey, Friedman, Leedom & Ferguson

[57] ABSTRACT

A base for a loudspeaker enclosure is formed of a lower base disk, an upper support disk and an interposed spacer element which together define an internal hollow space to which structure-borne sound is transmitted. The area of contact between the spacer element and the disks is relatively small is comparison to the area of the disks which defines the hollow space at top and bottom sides thereof. In a preferred embodiment, the disks are formed of a sound-insulating material, preferably rubber, and the spacer element is a spacer ring that peripherally defines the hollow space. Also, a bracing foot, preferably of an inverted frustoconical shape, may be carried upon the upper support disk, for which purpose a support plate is centrally mounted thereon.

20 Claims, 2 Drawing Sheets

BASE FOR A LOUDSPEAKER ENCLOSURE

BACKGROUND OF THE INVENTION

1. Field of the Invention

The invention relates to a base for a loudspeaker enclosure, including those for high fidelity stereo type speakers.

2. Description of Related Art

Through the base of a loudspeaker enclosure, sound emitted from the loudspeaker enclosure in the form of structure-borne sound is unintentionally transmitted to the surface on which the loudspeaker enclosure stands. Especially with enclosures for woofers, this can result in irritating droning effects. Thus, attempts have been made to minimize the transmission of structure-borne sound through the base of a loudspeaker enclosure.

Known are bases of metal having a conical shape. Here, the transmission of structure-borne sound is minimized in that the surface remaining for transmission is minimal. This requirement results in bases of a relatively pointed shape that, on the one hand, still transmit a relatively large amount of structure-borne sound and, on the other hand, furniture or valuable floor coverings, such as parquet or the like can be scratched by the pointed end of the cone.

Another known base is a simple disk of sound-insulating material, in particular of rubber, pressed cellulose, felt or the like. Even with such a base, no particularly good insulation of structure-borne sound is achieved.

SUMMARY OF THE INVENTION

The object of the present invention is to provide a base for a loudspeaker enclosure in which the transmission of structure-borne sound is minimized as much as possible.

According to a preferred embodiment of the invention, a base for a loudspeaker enclosure, in which the object described above is achieved, is comprised of a lower base disk formed of a sound-insulating material, in particular of rubber, at least one spacing element with a small surface area being attached to the base disk and projecting upward from the base disk, an upper support disk of a sound-insulating material, in particular consisting of rubber, attached to the spacing element and held at a distance from the base disk, and an inner hollow space formed by the base disk, the spacing element and the support disk. By virtue of this construction, a hollow space is created inside the base, between two planes of sound-insulating material, within which the structure-borne sound can die out freely. To create the inner hollow space, a spacing element is used that is designed to effect, simultaneously, as great as possible a structure-borne sound decoupling of the two disk-shaped elements.

Measurements have proven that the inventive base enables the transmission of structure-borne sound to be considerably less than that achieved with all bases for loudspeaker enclosures known up to now.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED

Figure 1:
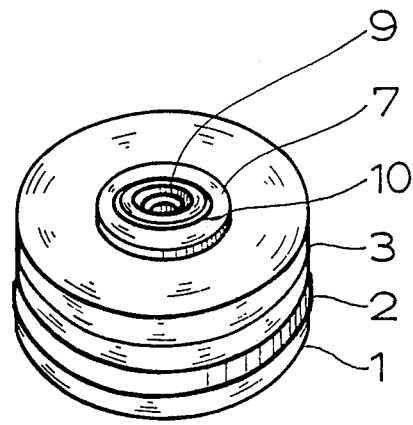
FIG. 1 shows, in perspective view, an especially preferred embodiment of a base for a loudspeaker enclosure according to the present invention.
Figure 2:
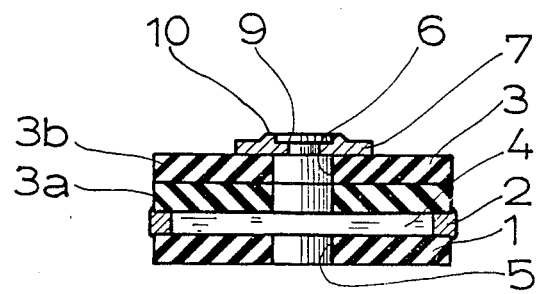
FIG. 2 is a cross-sectional view of the base of FIG. 1.

The base according to the invention, as represented in FIG. 1 in perspective view and in FIG. 2 in section, is comprised of a lower base disk 1 and an upper support disk 3, which are formed of a sound-insulating material, in particular of rubber, and at least one spacing element 2 of an annular shape having a small surface area in comparison to the area of the space encompassed thereby. Spacing element 2 is attached to base disk 1 and projects from base disk 1 upward. The upper support disk 3 is attached to an opposite side of spacing element 2 relative to base disk 1 and results in an inner hollow space 4 being formed by base disk 1, spacing element 2 and support disk 3. As FIG. 2 clearly shows, an area is created by inner hollow space 4 between base disk 1 and support disk 3 in which structure-borne sound that is transmitted to the base can die out very freely. In combination with the sound-insulating character of the material from which base disk 1 and support disk 3 are formed, an optimal insulating of structure-borne sound, i.e., a minimizing of the transmission of structure-borne noise, is achieved.

FIG. 2 shows, in combination with FIG. 1, that it is especially suitable to provide base disk 1 and/or support disk 3 with a, preferably centered, opening 5 or 6, respectively. The openings 5, 6 guarantee that the insulating air cushion located in inner hollow space 4 is not enclosed, but, rather, is in contact with the ambient air.

FIG. 2 also makes clear an especially suitable configuration of the base, according to the invention, wherein support disk 3 consists of several disk layers 3a, 3b. In this way, on the one hand, materials of the same thickness can be used for both base disk 1 and support disk 3, and on the other hand, the rigidity of support disk 3 relative to the rigidity of base disk 1 is increased, which is necessary to keep the sometimes relatively heavy loudspeaker enclosure really suspended over inner hollow space 4. Further, an especially good insulation of structure-borne sound can be achieved in this way. Optionally, disk 1 can be constructed of such disk layers, instead of or in addition of disk 3.

There are a number of possibilities for configuring spacing element 2. Spacing element 2 could, for example, be designed of a cam-like or knob-like shape, in which case several spacing elements 2 would be provided. Spacing element 2 could also be constructed as an edge formation, for example on base disk 1. The only essential requirement for spacing element 2 is that it not only creates inner hollow space 4, but maintains it open, i.e., so that during operation disks 1 and 3 cannot be substantially pressed together. In this respect, it is especially advisable to construct spacing element 2 as a spacing ring going around the outer periphery of base disk 1, as in the embodiment shown in the drawings.

For the material of spacing element 2, metal, for example chrome-plated brass, is especially suitable. But sometimes wood, hard rubber, or another material can be used.

The embodiment of spacing element 2 shown in FIG. 2 is especially preferred. This spacing element 2 is configured as a spacing ring having an outer peripheral edge lip on each of its top and bottom surfaces, the inner diameter of which corresponds to the outer diameter of base disk 1 or support disk 3. In this way, a perfect mutual alignment of the parts of the base is guaranteed.

It is advisable, overall, that base disk 1, spacing element 2 and support disk 3 are solidly connected, i.e., permanently fixed, to each other, in particular by being glued or molded onto each other.

The loudspeaker enclosure must in some way be set down on the base. This can occur in that it is simply laid flat on the top of support plate 3. But for insulation of the structure-borne sound, it is more suitable if the introduction of structure-borne sound occurs as far as possible from spacing element 2, i.e., in the embodiment represented here, in particular in the radial center of support disk 3. In this respect it is advisable that a support plate 7 for a bracing foot 8 be attached to the top of support disk 3, preferably centered. Such a support plate 7 can itself consist for example of a metal, in particular of chrome-plated brass. In any case, it need not consist of sound-insulating material. As bracing foot 8, for example, a cone-shaped element as represented in FIGS. 3 to 5 is suitable.

FIG. 1 makes it clear that, in the illustrated embodiment, support plate 7 is placed around opening 6 and preferably also has an opening 9. Further, to secure the loudspeaker enclosure or bracing foot 8 on support plate 7, it is advantageous if the support plate 7 be provided with an annular gripping edge 10 on its top surface.

Figure 3:
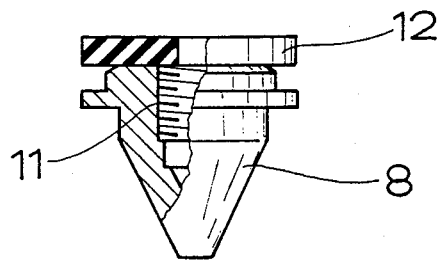
FIG. 3 shows a bracing foot with an optional nonslip plate, especially for the base of FIG. 1, in partial section.
Figure 4:
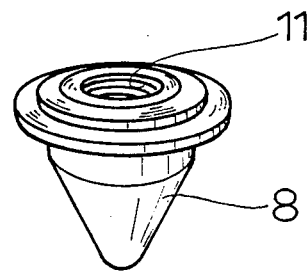
FIG. 4 is a perspective view of the bracing foot of FIG. 3, but without the optional nonslip plate.
Figure 5:
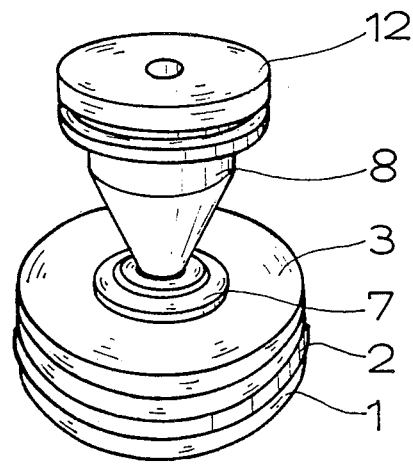
FIG. 5 shows the base of FIG. 1 in combination with the bracing foot of FIG. 3 in perspective view.

Above, it has already been indicated that an especially preferred embodiment of the base according to the invention is used in combination with the bracing foot 8, and that such a bracing foot 8 can be of a generally conical shape, as is represented in FIGS. 3 to 5. Conical bracing feet have, themselves, been known for use as speaker bases, as explained initially above, for a long time. However, because of the excellent insulating of structure-borne sound of the base according to the invention, the bracing foot 8, as represented in FIG. 3, can be configured more like a conical frustum, as opposed to the sharply pointed conical shapes of the prior art, i.e., having a relatively wide tip, since the insulation of structure-borne sound, here, is not achieved primarily by the tip configuration of bracing foot 8 but, instead, is achieved by the base constructed according to the invention. FIG. 5 shows an assembly of base and bracing foot 8, the conical frustum being inverted when mounted on the base.

Still other preferred features are apparent from FIGS. 3 to 5, namely, bracing foot 8 may be provided, on top, with a screw thread, preferably an inner thread 11, and/or a nonslip plate 12. Inner thread 11, indicated in FIGS. 3 and 4, serves to screw in an opposite thread on the bottom of the loudspeaker enclosure so that by simply turning bracing foot 8 the height of the loudspeaker enclosure can be adjusted and thus, unevenness, as can occur, for example, when a single enclosure is supported by plural bases, can be evened out. Nonslip plate 12, which is preferably formed of rubber or a similar material, of course, allows no height adjustment, but combines a further improved insulation of structure-borne sound with an ability to prevent slipping of a loudspeaker enclosure, thereby enabling the enclosure to be simply placed on it.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Base for a loudspeaker enclosure, comprising a lower base disk formed of a sound-insulating material, at least one spacing element attached to said base disk and projecting upward therefrom, and an upper support disk formed of a sound-insulating material that is attached to an opposite side of said spacing element relative to said base disk, wherein an inner hollow space is defined by said disks and by said spacing element, and wherein an area of contact between said disks and said inner spacing element is relatively small in comparison to an area of said disks defining said inner hollow space.

2. Base according to claim 1, wherein at least one of said base disk and said support disk have an opening therethrough which communicates with said inner hollow space.

3. Base according to claim 2, wherein said opening is radially centrally located.

4. Base according to claim 1, wherein at least one of said base disk and said support disk are formed of several disk layers.

5. Base according to claim 1, wherein the support disk is formed of a plurality of disk layers.

6. Base according to claim 1, wherein said spacing element is configured as a spacing ring extending along an outer periphery of said base disk.

7. Base according to claim 1, wherein said spacing element has an outer edge lip on each of bottom and top surfaces thereof, each outer edge lip having an inner diameter that corresponds to an outer diameter of a respective one of said base disk and said support disk, around which said lip extends.

8. Base according to claim 1, wherein the base disk, spacing element and support disk are solidly connected to each other.

9. Base according to claim 3, wherein at least one of said base disk and said support disk are formed of several disk layers.

10. Base according to claim 3, wherein the support disk is formed of a plurality of disk layers.

11. Base according to claim 6, wherein said spacing element has an outer edge lip on each of bottom and top surfaces thereof, each outer edge lip having an inner diameter that corresponds to an outer diameter of a respective one of the outer diameter of said base disk and said support disk, around which said lip extends.

12. Base according to claim 11, wherein the base disk, spacing element and support disk are solidly connected to each other.

13. Base according to claim 1, wherein a support plate for a bracing foot is mounted centrally on top of the support disk.

14. Base according to claim 13, wherein the support plate is placed around an opening formed in the support disk, said support plate having an opening communicating with the opening in the support disk.

15. Base according to claim 13, wherein the support plate possesses an annular gripping edge on a top surface thereof.

16. Base according to claim 13, wherein a conical bracing foot is provided on said support plate.

17. Base according to claim 16, wherein said bracing foot is configured as a conical frustum having a relatively wide tip for engaging said support plate.

18. Base according to claim 16, wherein said bracing foot has an inner thread on a top end thereof for receiving a threaded loudspeaker enclosure mounting screw.

19. Base according to claim 16, wherein said bracing foot is provided with a nonslip plate on a top end thereof.

20. Base according to claim 1, wherein said sound-insulating material is rubber.

* * * * *